United States Patent [19]

Lerner

[11] 4,437,867
[45] Mar. 20, 1984

[54] REMOVAL OF UNDESIRED COMPONENTS FROM GASES

[76] Inventor: Bernard J. Lerner, 727 Orchard Hill Dr., Pittsburgh, Pa. 15238

[21] Appl. No.: 936,078

[22] Filed: Aug. 23, 1978

Related U.S. Application Data

[63] Continuation of Ser. No. 796,198, May 12, 1977, abandoned.

[51] Int. Cl.³ .................. B01D 45/08; B01D 50/00
[52] U.S. Cl. .......................... 55/233; 55/242; 55/257 PV; 55/257 QV; 55/259; 55/308; 55/327; 55/394; 55/423; 55/424; 55/444
[58] Field of Search .............. 55/90, 259, 257 PV, 55/257 QV, 233, 234, 242, 307, 308, 392, 394, 440, 442–446, 423, 424, 484, 327

[56] References Cited

U.S. PATENT DOCUMENTS

| | | | |
|---|---|---|---|
| 735,193 | 8/1903 | Allert | 55/484 X |
| 1,088,318 | 2/1914 | Bicalky | 55/242 X |
| 1,117,309 | 11/1914 | Bentz | 55/242 X |
| 1,616,802 | 2/1927 | Hosch | 55/440 |
| 1,769,071 | 7/1930 | Raney | 55/308 X |
| 1,824,891 | 9/1931 | Hill | 55/242 X |
| 2,083,764 | 6/1937 | Weisgerber | 55/444 X |
| 2,310,645 | 2/1943 | Mohun | 55/263 |
| 2,567,030 | 9/1951 | Schaaf | 55/489 |
| 2,610,893 | 9/1952 | Collins et al. | 55/90 UX |
| 2,760,597 | 8/1956 | Brixius | 55/440 |
| 3,135,592 | 6/1964 | Fairs et al. | 55/96 |
| 3,190,057 | 6/1965 | Sinex | 55/481 |
| 3,410,057 | 11/1968 | Lerner | 55/259 X |
| 3,444,670 | 5/1969 | Hungate | 55/440 X |
| 3,616,623 | 11/1971 | Reid | 55/440 |
| 3,733,789 | 5/1973 | Rebours | 55/233 |
| 3,751,886 | 8/1973 | Sokolowski | 55/318 |
| 3,873,281 | 3/1975 | Himes et al. | 55/354 X |
| 3,964,886 | 6/1976 | Engalitcheff, Jr. et al. | 55/257 P UX |
| 4,022,593 | 5/1977 | Lerner | 55/90 |
| 4,084,945 | 4/1978 | Chirico | 55/90 X |

FOREIGN PATENT DOCUMENTS

| | | | |
|---|---|---|---|
| 531515 | 1/1922 | France | 55/327 |
| 178262 | of 1923 | United Kingdom | 55/440 |

Primary Examiner—Kathleen J. Prunner
Attorney, Agent, or Firm—Hymen Diamond

[57] ABSTRACT

A gas scrubber and/or mist eliminator for high-velocity gas in the range between about 1,000 to 2,500 feet per minute. The gas flows horizontally through a duct or conduit in which a plurality of generally vertical, high-voidage, fibrous, non-capillary, free-draining bodies are interposed. The gas both passes through and is deflected by the bodies and its mist and/or other components are captured and drained by the bodies. Reentrainment of the drained liquid flowing out of the bodies is prevented. The bodies may be arrays of rows of separate baffles or they may be mounted on vanes.

6 Claims, 10 Drawing Figures

REMOVAL OF UNDESIRED COMPONENTS FROM GASES

REFERENCE TO RELATED APPLICATION

This application is a continuation of application Ser. No. 796,198 filed May 12, 1977 to Bernard J. Lerner for REMOVAL OF UNDESIRED COMPONENTS FROM GASES, now abandoned.

BACKGROUND OF THE INVENTION

This invention relates to the removal of undesired components from fluids and has particular relationship to such removal where the fluids flow at high velocities between about 1,000 and 2,500 feet per minute. While in the interest of being concrete in dealing with the details of this invention, this application concerns itself with the removal of undesired components from gas, it is also applicable, in its broader aspects, to the removal of undesired components from liquids. To the extent that this invention is so applicable to liquids, such application is within the scope of this invention. The components which are removed from a gas may be soluble such as soluble salts or acids, for example acetic, nitric or hydrochloric acid, or insoluble particulate such as sulfur, carbon powder, fly ash or graphite. The components may also be mist, either initially present or deliberately, injected into the gas to dissolve soluble particulates and to wet and wash down insoluble particulate. Essentially, this invention serves for gas scrubbing and/or mist elimination for high velocity gas flow.

Separation and removal of undesirable or contaminant particulates from a gas stream in accordance with the teachings of the prior art has been effected by two principal methods: gas filtering and centrifugal force separation. Gas filters are comprised of porous, foraminous or fibrous media, woven or nonwoven through which the gas is wholly conducted. Filters separate by means of inertial impaction and impingement of the particles on the fibers as the gas containing the particles passes through the filters. For removal of small particle sizes, the fibers must be fine. While gas filters are reasonably effective in particulate removal, the gas velocity through a filter must be maintained at relatively low levels to avoid excessive and uneconomic gas pressure drops. This is particularly true in the case of fine particulate filtration, where the particles are in the 1–20 micron size range and the fibers are very fine, typically in the 10 to 200 micron range. Gas pressure drop through a fibrous filter is approximately proportional to the square of velocity of the gas in the turbulent flow region. Industrial fine particulate filters, such as baghouses, consequently have very large filter surfaces, operating typically at 5 to 50 feet per minute gas face velocity, and are relatively expensive. Further, the optimum ranges of gas velocity through the filter media required to achieve efficient particle removal by the mechanisms of interception and impaction are invariably higher than those which can be practically and economically employed because of the gas-pressure drop across the filter which results at such higher velocities.

While fibrous or filamentary woven or felted gas filter media are applicable to particulate removal, including mist filtraion, they do not readily lend themselves to continuous washing in the case of solid particulate removal or to too high liquid loads in the case of mist removal alone. Because of the uniformity and small size of the fluid passages through such filter media, and the competition of liquid and gas flow for these fluid flow passages, the flow capacity of the filter for gas is restricted because of the presence of liquid, or that for liquid because of the presence of the gas. If a filter medium is used which possesses even a moderate degree of dynamic capillarity, under a specific combination of gas and liquid loadings, liquid is retained and gas flow choked off except at extremely high gas-pressure drops. Dynamic capillarity, or the equivalent dynamic liquid holdup in a medium, is the tendency to retain liquid in the pores of a medium, which exists under flow conditions of the gas and the dynamic loading rate by such flow of the medium with liquid.

"Dynamic loading rate" refers to the liquid holdup in a pervious medium such as a filter under dynamic conditions; i.e., during gas and liquid flow through the medium. Quantitatively dynamic loading rate is expressed as the fractional volumetric liquid retention of the medium under flow conditions. When the retention reaches a constant level, the dynamic loading is said to be stable. Dynamic loading rate is distinguished from static loading rate. "Static loading" refers to liquid retention under zero flow of liquid and gas. A capillary medium has high static liquid loading; a non-capillary material has low static and low dynamic loading; a non-free draining, non-capillary material has low static and high dynamic loading.

The capillarity effect is enhanced by the continuous injection of liquid by the flowing gas into the medium. In the case of static capillarity, the only force counteracting the capillary force is gravity. In the case of dynamic capillarity, the capillary force is counteracted in addition by the force exerted by the gas and augmented by the continuous loading of liquid. The effect of appreciable liquid loadings on such capillary filter media resulting from dynamic capillarity is to make the media behave as a virtually solid wall with respect to gas flow. For dynamic liquid loads, such as are generated by filter washing, even a small degree of capillarity yields significant gas flow passage closure with liquid. Additionally, if the gas stream contains solid insoluble particulates, capillary filter media are highly susceptible to solid plugging.

Rebours, U.S. Pat. No. 3,733,789, which is typical of the prior art of this type, uses a sprayed tubular filter cloth to form a continuous stable film of washing liquor on the cloth through which the gas is "microsieved." Rebours' data on gas-flow resistance as a function of linear gas velocity illustrates the typically high-resistance/low-flow characteristics of the capillary filter media, whether woven cloth or compacted or felted fibrous material. Rebours' teaching is specific for liquid "micromists" and as pointed out by Rebours, solid insoluble particles unfailingly clog the filter after a few hours of operation.

Fairs, U.S. Pat. No. 3,135,592, also discloses an irrigated filter medium but in countercurrent liquid-gas flow. Fairs' gas velocities are about 15 feet per minute and fall into Rebours' range of 4 to 20 feet per minute representing essentially laminar, as distinct from turbulent flow, gas flow. Rebours and Fairs are limited to such low gas velocities because the gas-flow passages are clogged with liquid. Sprayed screen devices such as those of Alliger, U.S. Pat. No. 3,763,634, and Mare, U.S. Pat. No. 3,785,127, suffer from the same gas-flow limitations resulting from the necessity of trying to force both liquid and gas through uniform-openings restricted with respect to liquid and gas flow and/or capillary flow space in a filter medium with uniform openings. Lucas, U.S. Pat. No. 3,370,401, discloses a teaching similar to that of Fairs, except that the fibrous filter medium is deliberately operated in the flooded condition.

Centrifugal-force separators, such as devices with parallel-vane serpentine or sinusoidal-paths, or chevron or zig-zag passages, are used primarily for mist elimination, in clean gases not containing solid particulate. Such parallel vane separators are commonly used for removing liquid carryover in steam boilers, water-cooling towers, and in gas-liquid contacting apparatus such as distillation or fractionation towers, evaporators, gas-scrubbing apparatus and the like. Another area of application is the removal of mists from the air intakes of power turbines such as marine-power or propulsion plants. In such separators the fluids carrying the suspended matter is bent or deflected by the vanes and the suspended matter is ejected by centrifugal force. The force exerted on a particle of mass M is $M(v^2/r)$, where v is the velocity of the particle and r the radius of the path. It is desirable that v should be high or r small.

Centrifugal-force impaction separators operate at much higher velocities than do filter media, and are used for low-load liquid mist removal or for batch particulate removal. In zig-zag sinusoidal-passage parallel-planar types of separators, the removed liquid must drain under the influence of gravity without accumulating within the passages or being otherwise subject to reentrainment in the gas. Liquid occurring either as a mist, or as a deliberately-introduced spray wash that has been removed and collected as drops or as a liquid film on surfaces exposed to the flowing gas, is subject to being dragged along in the direction of gas flow by gas friction and momentum transfer. The resulting liquid carrythrough or reentrainment lowers the overall liquid removal efficiency. Various expedients have been suggested to overcome this deficiency. Hosch, U.S. Pat. No. 1,616,802, describes a serpentine-passage separator having liquid-collection baffles protruding from the peaks of the corrugations. Other modifications of the sinusoidal or zig-zag-path vane separators are typically shown by Clark, U.S. Pat. No. 2,802,543, Sokolowski, U.S. Pat. No. 3,751,886, Hurlburt, Sr. et al, U.S. Pat. No. 3,757,498, Hill, U.S. Pat. No. 3,813,855, and Regehr, U.S. Pat. No. 3,849,095. These show the use of solid, planar-wall vanes, having various catchments or arrangements to drain the liquid removed. However, such protrusion catchments, particularly those opening up toward the upstream side, are subject to gas impact and momentum transfer to the collected liquid in the exposed pocket. The liquid is unprotected with respect to gas friction and momentum transfer and is picked up and entrained in the gas. On the other hand, turning the catchments or protrusions to the down-stream side serves to introduce low-pressure accelerated gas-flow regions immediately downstream of the liquid catchment, which serves to suck or aspirate the liquid out of the protective pocket into the stream. These deficiencies of prior-art apparatus result in limited liquid loading or handling capability and a tendency to reentrain liquid at relatively low gas velocities.

In accordance with the teachings of the prior art, there are also provided gas-permeable structures defining serpentine passages or channels for the gas. Typical of this prior art are Schaff, U.S. Pat. No. 2,567,030, and Brixius, U.S. Pat. No. 2,760,597. Schaff and Brixius disclose particulate filter panels consisting of alternating corrugated layers of paper, fly screen and similar materials. Such filters are for "dry" use, inasmuch as the capillary nature of the internal walls would prevent gas permeation under liquid irrigation or a mist load. The corrugated layers of the Schaaf and Brixius filters are horizontally disposed with alternate layers reversely corrugated. If an attempt were made to use such devices for mist removal or other wet application, liquid drainage would be seriously impeded and such devices would be highly inefficient. The filter panels of this prior art are specifically disposable—and are intended for one-time batch use until plugged, at which time such filters are either discarded or removed from service and re-worked.

It is an object of this invention to overcome the above deficiencies and drawbacks of the prior art and to provide apparatus for removing undesired components from gas flowing at high velocity which apparatus shall readily drain the impinging liquid and/or particulate, shall be readily permeable to the gas, shall not become clogged by liquids or particulates and shall not require frequent replacement.

SUMMARY OF THE INVENTION

In accordance with this invention, particulates, solid and/or liquid such as mist are removed from a high-velocity particulate-laden gas stream by passing the gas through a series of generally vertical non-capillary, high-voidage, free-draining, fibrous-body means. This fibrous-body means may comprise a plurality of rows of separate fibrous-body baffles with the baffles staggered; i.e., the baffles in each row displaced along its row with respect to the baffles in the rows upstream and downstream with respect to it. The staggering is such that the baffles in each row are aligned with the gaps between the baffles in the rows upstream and downstream from it. In this form of the invention, the gas is partially deflected by the baffles of succeeding rows flowing in a sinuous path sharply curved around the baffles. The fibrous-body means may also be in the form of fibrous strips secured to the walls of sinuous or serpentine or zig-zag vanes in the path of the gas. The gas in this case also flows in curved, sinuous or serpentine paths and in part through the strips.

In accordance with the broader aspects of this invention, solid particulate may be removed from a dry gas by passing the gas in dry condition through the fibrous-body means. So that the body means used in this way will not ultimately clog, it may be sprayed periodically with sufficient liquid to wash down the captured particulate.

In accordance with this invention in its specific aspects, solid particulate may also be removed by spraying the fibrous-body means with a liquid as the contaminated gas is flowing through it. The sprayed liquid flows either counter to the gas or in the same direction as the gas or has flow components counter-current or in the direction of the gas. There should be sufficient liquid to dissolve any soluble particulate and wash it down the fibrous bodies and to wash down the insoluble particulate. The liquid may also be injected into the flowing gas as a mist. In this case the mist and any particulate dissolved in it and the insoluble particulate are captured by the fibrous bodies and washed down.

The fibrous-body means operates both as centrifugal separator and as filter. The portion of the gas deflected by the baffles or by the vanes flows in an arcuate path and the particulate matter including mist is ejected by centrifugal force from the stream, impinging on adjacent baffles or walls when it is drained. From the portion of the gas that flows through the baffles or fibrous strips, the particulate matter is removed and washed down as described. The separate baffle structure according to this invention has advantages over the vane structure of the prior art. The resistance to gas flow; i.e., the pressure drop, is lower in the baffle structure according to this invention at equal gas velocities.

When used alone in this specification or in the claims, the word "fibrous" is intended to include within its scope filamentary; the word "fibrous" is also intended to include within its scope fibrous mats, ribbons and wire systems such as steel wool and the like and non-capillary wire mesh. The fibrous-body baffles or strips used in this invention are typically made of bonded non-woven high-loft materials, examples of which are typically described by Taylor, U.S. Pat. No. 3,526,557, and Kinsley, U.S. Pat. No. 3,920,428, or open-celled reticulated polyurethane foam as described in Sinex, U.S. Pat. No. 3,190,057, or of expanded metal. The fibrous-body material may also be a lofty, open, non-woven, three-dimensional light web formed of many interlaced randomly disposed fibers as disclosed in Maisel, U.S. Pat. No. 2,784,132, or Hoover, U.S. Pat. No. 2,958,593. This material must also be non-capillary. Another typical fibrous-body material is a knitted-mesh pad wherein the individual layers of knitted material have been severely crimped or distorted so as to render the mesh openings non-uniform and non-capillary. To minimize gas-flow resistance through the fibrous-body baffle, internal void space of the baffle is preferably very high (high voidage), usually greater than 90%.

It is essential that the fibrous-body means be free-draining with respect to liquid, not have high wet-gas-flow resistance relative to the dry-gas-flow resistance, and be free from any tendency to flood, i.e., fill with retained liquid. To minimize liquid reentrainment, the fibrous-body means shall be of sufficient thickness along the direction of gas flow to allow rapid protected liquid drainage. Preferably, this thickness should be not less than ¼ inch, to provide for free drainage of liquid in the interior or downstream side of the baffle or strip. The draining stream on the downstream side is thus protected from excessive gas friction by the shielding effect of fibrous material on the upstream side of the strip. To optimize this protected-drainage effect, it is desirable that the gas flow be generally horizontal with the fibrous-body baffles or strips disposed in a substantially vertical position completely across the stream so that no gas flows under the baffles. Liquid drainage then occurs with minimum retardation and frictional drag by the gas flow, and is sufficiently rapid so that the fibrous-body baffles and strips may be continuously spray-irrigated without any significant accumulation of liquid.

The fibrous-body means may, in the practice of this invention, be arranged in different configurations, such as to define serpentine passages with parallel-planar walls or chevron arrangements or as separate baffles in staggered rows or as deflecting panels arranged in series in the direction of flow. Such configurations of whatever form are referred to herein as imparting to the gas a circuitous path. When a serpentine-passage configuration is used, the preferred angle of inclination, of the longer dimension of the transverse cross section of the strip, with respect to the direction of gas flow is between 20° and 70°. Typically, the porous bodies are secured to vanes guiding the gas in circuitous paths. When a staggered baffle arrangement is used, the angle of inclination of the length dimension of the transverse cross-section of the baffle may range from 90° (normal to gas flow direction) to 30°. Along their heights the strips or baffles are generally vertical.

In some applications, it may be preferable to employ a fibrous body with anisotropic properties with respect to gas flow and gas-flow resistance. For example, a fibrous body constructed or fabricated in layers or sheets generally parallel to the outer surfaces will normally have lower gas-flow resistance for flow parallel to such layers than for gas flow normal to such layers. Such an anisotropic fibrous body may be used to afford a higher degree of protection from gas friction or liquid drainage in the interior of the fibrous body by orienting the anisotropic fibrous body so that the high-resistance gas-flow path is normal to the exterior surface of major dimension. Alternately, if protection of liquid drainage is a secondary consideration and augmented gas flow through the fibrous body is desired, the preferred orientation of an anisotropic fibrous body would then be such that the low-resistance gas-flow path is normal to the exterior surface of major dimension.

BRIEF DESCRIPTION OF THE DRAWINGS

For a better understanding of this invention, both as to its organization and as to its method of operation, together with additional objects and advantages thereof, reference is made to the following description taken in connection with the accompanying drawings in which:

FIG. 3 is a view in perspective of a bracket used to hold and drain the fibrous-body baffles of the embodiment shown in FIG. 1;

FIG. 9 is a view in transverse section enlarged through an anisotropic baffle positioned to offer low resistance to the gas; and FIG. 10 is a view in transverse section enlarged through an anisotropic baffle positioned to offer higher resistance to the gas.

DETAILED DESCRIPTION OF INVENTION

Figure 1:
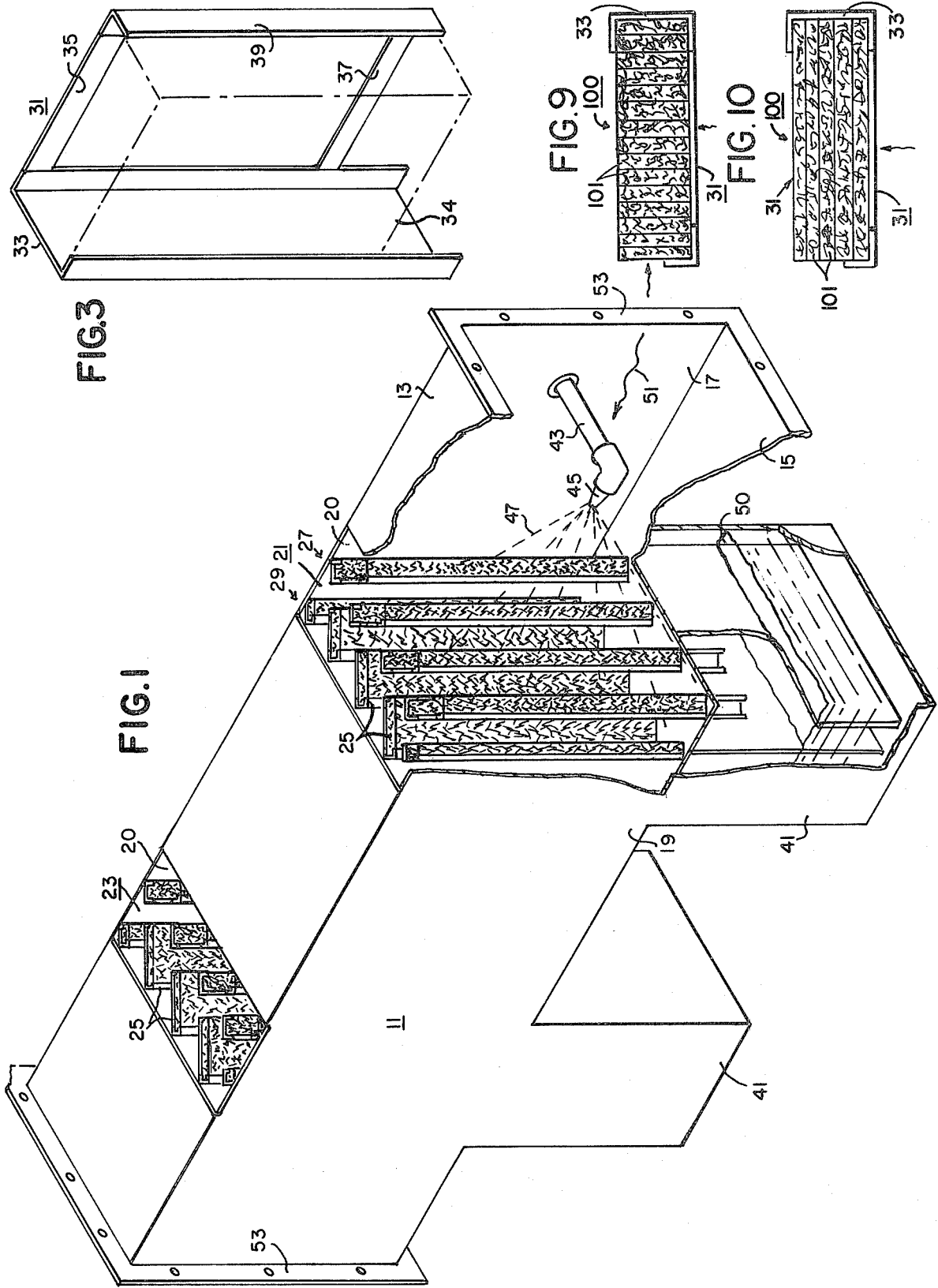
FIG. 1 is a view in perspective with part of the top wall 13 of the duct or conduit 11 broken away, showing an embodiment of this invention.
Figure 2:
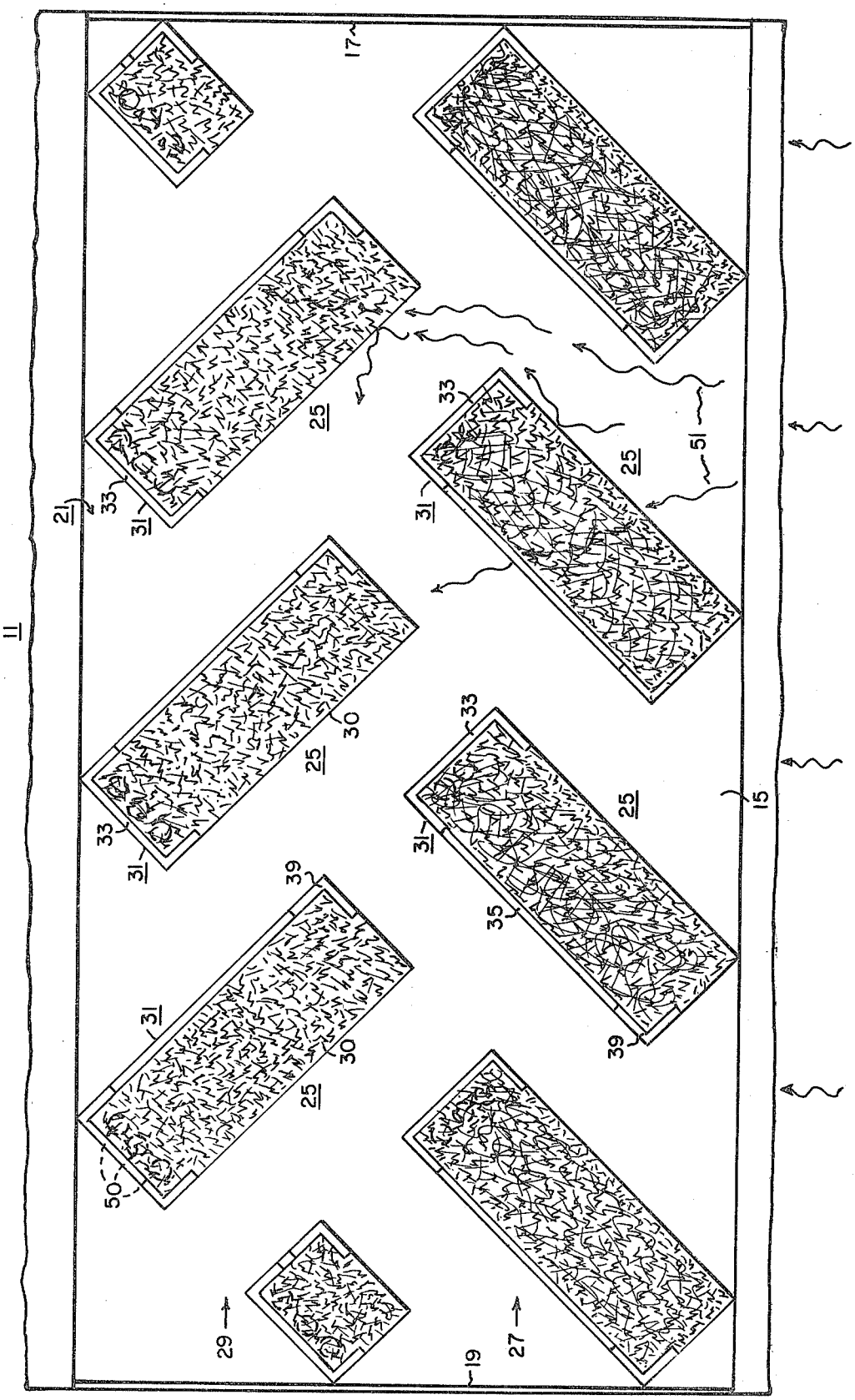
FIG. 2 is a plan view showing one stage of fibrous body baffles 25 of the embodiment shown in FIG. 1.

The apparatus shown in FIGS. 1, 2, 3 includes a duct or conduit or flow channel 11 for treating the gas. This duct is in the form of an open-ended box having a top wall 13, a bottom wall 15 and side walls 17 and 19. The top 13 has openings 20 for mounting of the baffles 25, but these openings are closed by plates (not shown) after the baffles 25 are mounted. Within the duct 11 there is fibrous-body means in the form of two stages 21 and 23 of fibrous-body baffles 25, each stage having a plurality of rows 27 and 29 of the baffles 25. While the embodiment shown in FIGS. 1, 2, 3 has only two rows of baffles per stage, there may be a larger number of rows per stage. The duct 11 extends horizontally and each baffle 25 is mounted substantially vertically and is of fibrous, high-voidage, non-capillary, free-draining material. The baffles 25 in different rows 27 and 29 are staggered with respect to each other, the baffles in row 29 being displaced along the row with respect to the baffles along row 27 so that the baffles 25 of row 29 are coextensive with the spaces between the baffles of row 27.

The fibrous body 30 of each baffle 25 is mounted in a frame 31 formed of a channel section 33 and bars 35 and 37 extending from one lip of the channel and an angle section 39 secured between the extending ends of the bars 35 and 37. The fibrous body 30 is in the form of a rectangular parallelepiped and it abuts the web 34 of the channel section 33 along the thickness dimension of the body 30, the bars 35 and 37 at its upper and lower ends along the width dimension and the angle 39 along one edge (FIG. 1). The frame 31 is secured by welding or otherwise to the bottom 15 of the duct 11. The channel-section 33 extends below the fibrous body 30.

The row 27 requires a different bracket 31 than the row 29. The bracket shown in FIG. 3 is appropriate for the bodies 25 of the row 29. For the row 27 the bars 35 and 37 and the angle 39 should be on the left-hand side of the channel 33 with reference to FIG. 3 (see FIG. 2).

As shown in FIG. 2, the baffles 25 in the first row 27 are at about +45° to the direction of gas flow and the baffles 25 in the second row are at about −45° to the direction of gas flow. Typically, this angle may vary from 90°, perpendicular to the gas-flow direction, to + and −30° to the gas-flow direction.

Below each stage 21 and 23 there is a tank 41. The projecting ends of the channels 33 extend into the tank. Typically each fibrous body 30 is 2¾ inches long, 1 inch wide and 12 inches deep. The spacing between adjacent baffles of each row and between the baffle on the first row 27 and the adjacent baffle of a succeeding row 29 is 1 inch.

The apparatus includes a spray header 43 to which nozzle 45 is connected. A liquid, typically water, is supplied to the header 43 and projected as a spray 47 towards the downstream sides of the channel 11. As shown, the spray also impinges on the baffles 25 of the stage 21. A like nozzle may be disposed between the first stage 21 and the second stage 23. In accordance with an aspect of this invention, the nozzles may be provided on the downstream sides of the stages 21 and 23. Such nozzles irrigate the baffles 25 so that particulate from dry gas passing through and captured by the fibrous-body means is washed down.

In the use of the apparatus, gas (air) at a high velocity is transmitted through the duct in a substantially horizontal stream in the direction of the arrow 51. The gas picks up liquid mist from the sprays 47 and so misted passes through the stages 21 and 23 of baffles 25. As shown by the arrows in FIG. 2, the gas partly passes through the fibrous bodies 30 and partly is deflected by the bodies and then is deflected and passes through other fibrous bodies 30. A portion of the gas stream, passing through a fibrous body gives up its particulate, solid and mist, to the fibers; a portion also impinges on the channel section 33 and gives up its particulate to the section 33. The liquid resulting from the captured mist drains through the fibrous body and down the channel section 33 into container 41, whence it may be removed. The bottom 15 is provided with holes 50 under the channels through which the liquid flows into tanks 41. The gas flowing through each fibrous body 30 forces a large part of the mist captured by the fibers onto the channel section 33. For this reason the preponderant portion of the liquid resulting from the mist is drained down the channel section 33 into the tank 41. The channel sections 33 extend into the pool 50 formed in the tank 41. The liquid which drains along the channels sections 33 is protected from reentrainment by the upstream portion of the fibrous body 30 and by the base 15 of the duct 11.

The duct 11 is provided with flanges 53 so that a number of double stages may be connected in series. A plurality of ducts 11 as shown in FIG. 1 may be stacked to form a multi-duct unit vertically. In this case the tanks 41 extend only from the base 15 of the lowermost duct. Each duct has a bottom for supporting the baffles 25, but only the uppermost duct has a top 13. The baffles 25 along the stacked ducts are coextensive. The liquid drains along the coextensive baffles 25 through the holes 52 in each base 15 or through enclosed horizontal troughs.

The orientation of the fibrous baffles 25 and the thickness of such baffles are both dependent on the density and gas-flow resistance of the fibrous baffle material. The preferred gas linear velocity range of operation of the apparatus shown in FIGS. 1-3 in the practice of this invention is from 1000 to 2500 ft./min., based on the superficial or empty cross-sectional gas-flow area. Within this range, it has been discovered that a surprisingly high degree of gas flow is obtained through relatively thick fibrous baffles 25, used in the practice of this invention, at gas pressure drops that are substantially less than those that are obtained with flow through identical solid-body baffle configurations. This was determined by the following comparison tests:

These tests were carried out with apparatus in accordance with this invention, as shown in FIGS. 1 through 3, but with only one stage 21 of baffles. The fibrous baffles 25 were each 1″ thick, 2¾″ long, and 12″ high. The baffles were non-capillary, bonded, nonwoven, high-loft pads of 40-micron diameter polyester fibers bonded with a polyvinylchloride resin. The gas flow section through the baffles was 12″ square. In the test gas flow was supplied by a 7.5 HP blower, ducted to the flow section by a 12″ diameter, 5 ft. long, rigid aluminum pipe. Pressure drop was measured by means of an inclined manometer across the test section. For comparison purposes, the operation of the apparatus shown in FIGS. 1–3 was compared to the operation of similar mock-up apparatus in which the baffles are of solid wood. The results are shown in the following Table I:

TABLE I

| Velocity, fpm | ΔP, in in. $H_2O$ |
|---|---|
| (a) Wood Baffles | |
| 1484 | 2.7 |
| 1625 | 3.2 |
| 1696 | 3.8 |
| 1837 | 4.5 |
| 1660 | 3.5 |
| 1784 | 4.1 |
| (b) Fibrous Baffle | |

TABLE I-continued

| Velocity, fpm | ΔP, in in. H₂O |
|---|---|
| 1682 | 2.0 |
| 1893 | 2.5 |
| 2209 | 3.0 |
| 2436 | 3.5 |

Figure 4:
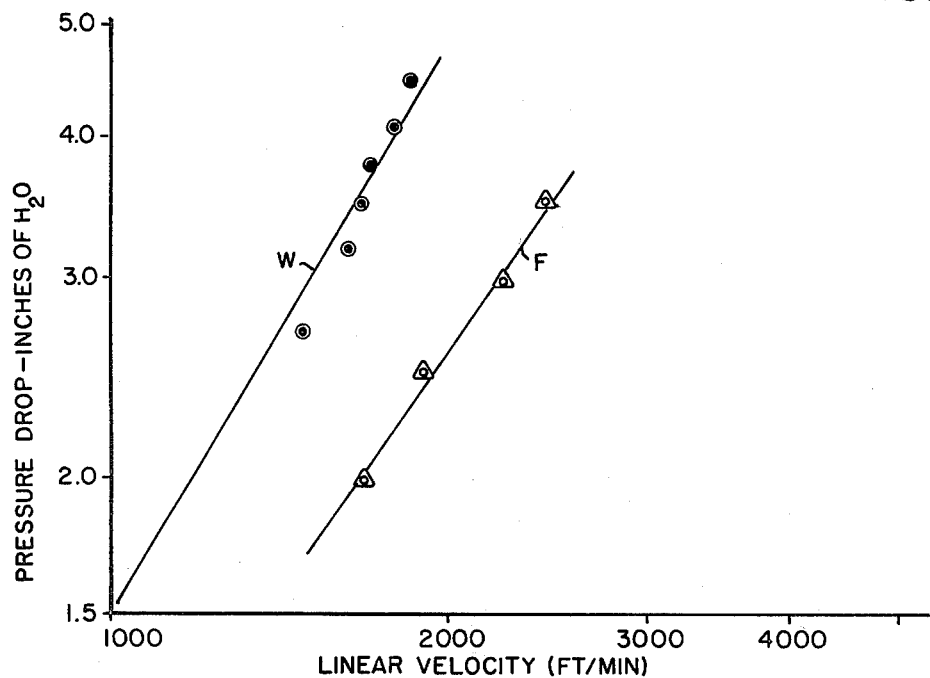
FIG. 4 is a graph showing the relationships between the pressure drop and gas velocity for the apparatus shown in FIG. 1 and for the same apparatus with wood baffles.

These data are plotted in FIG. 4, as log of pressure drop vs. log of linear velocity. In this view, log of pressure drop, ΔP, in inches of water, is plotted vertically and log of gas velocity in feet per minute is plotted horizontally. Curve F is for the fibrous baffles 25 and curve W for the wooden baffles.

Table I shows that the fibrous-body baffles transmitted a significant fraction of the gas as is manifest from the remarkably lower pressure drop at equal superficial gas velocities. This decrease in pressure drop is substantially greater than was anticipated. The gas flow through the fibrous-body baffles 25 can be determined approximately on the assumption that pressure drop in turbulent gas flow across an obstructed flow system is proportional to the square of the gas velocity. FIG. 4 shows this to be a fair approximation as the slopes of the linar graphs is 2.

$$(\Delta P_f / \Delta P_w) = (V_f / V_w)^2$$

where $\Delta P_f, \Delta P_w$ = Pressure drop across fiber and wood baffles, respectively.

$V_f/V_w$ = Ratio of gas flow velocities external to baffle bodies, fiber or wood With reference to FIG. 4, at V = 2000 ft./min.

$$(V_f/V_w)^2 = (\Delta P_f/\Delta P_w) = (2.6/5.0)$$
$$\text{and } (V_f/V_w)^2 = 0.52$$

$$\text{and } V_f = (0.52)^{\frac{1}{2}} V_w = 0.72 V_w$$

so that at least 28% of the gas flow must go through, rather than around, the fiber-body elements. The number of stages in series necessary to pass a total of 95% of the gas through the fibrous pads can be calculated as:

$$95 = 100[1 - (1-f)^n]$$

where f = Fraction of gas going through fibrous bodies in one stage 21 or 23 of FIG. 1.
n = Number of stages required for 95% gas transmission through fibrous bodies.

$$95/100 = [1 - (1 - 0.28)^n]$$

$$(0.72)^n = 0.05$$

n = 9.1 stages

Figure 5:
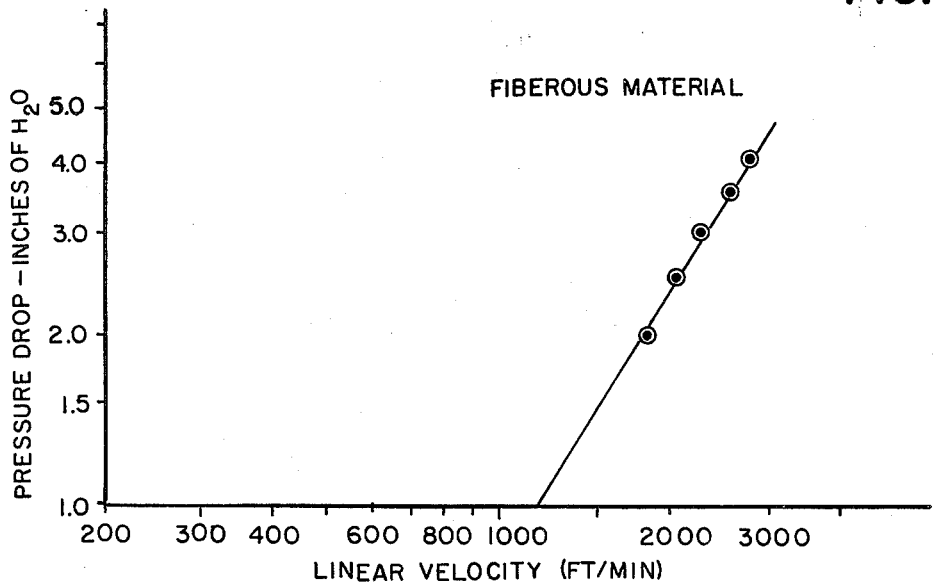
FIG. 5 is a graph showing the pressure drop through a fibrous body used in the practice of this invention as a function of the velocity.

Implicit in the above calculation are two off-setting assumptions. First, it is assumed that there is negligible flow resistance for gas flow through the fibrous-body baffles or pads and second, that no pressure-drop correction is necessary for the reduction in inter-baffle passageway velocity resulting from the flow through the fibrous baffles 25. To arrive at a corrected baffle gas-transmission estimate, data were taken on the pressure drop of the fiber-body pad used in the above tests when employed as a direct-filter material (100% gas transmission). This data is presented in the following Table II and is plotted in FIG. 5. In FIG. 5 log of pressure drop, ΔP, in inches of water is plotted vertically and log of velocity in feet per minute horizontally.

TABLE II

| Linear Velocity, fpm | ΔP, in inches of H₂O |
|---|---|
| 1848 | 2.0 |
| 2046 | 2.5 |
| 2288 | 3.0 |
| 2508 | 3.5 |
| 2794 | 4.0 |

From FIGS. 4 and 5 the separate inter-baffle gas velocity and the velocity of the gas transmitted through the baffles 25 are obtainable. These values are obtained by trial-and-error calculation of the separate component pressure drops based on the assumption that the separate pressure drops should add up to the experimentally-determined total pressure drop.

The 2.6 inch pressure drop at a superficial linear velocity of 2000 fpm (FIG. 4) consists of two components: a partial "solid-baffle" pressure drop, $\Delta P_i$, due to the inter-baffle velocity, $V_i$, and a pad-flow pressure loss, $\Delta P_f$, due to gas flow at $V_f$ feet/minute through the pads. The sum of the two velocities must equal the total velocity of 2000 feet/minute. From the pressure drop data of FIG. 4 and the pressure drop behavior of the pad material at 100% gas transmission (FIG. 5), it is possible to estimate pad flow by trial-and-error calculations. At the superficial velocity of 2000 feet/minute, it is found that the velocity through the pad is 800 feet/minute, indicating 40% gas-flow transmission through the pad. For this level of flow transmission, 5.9 stages would be required for filtration of 95% of the gas through the pads. This method offers a fairly straghtforward technique for choosing the optimum fiber-body pad or baffle thickness, material characteristics, orientation and number of stages.

The effectiveness of the apparatus in accordance with this invention as shown in FIGS. 1-3 as a mist eliminator was demonstrated as described in the following Example I.

EXAMPLE I

This operation was carried out with the two-stage apparatus as shown in FIGS. 1 through 3 with the non-capillary, bonded, high-loft pads (baffles) 25 of the composition, bonding, and dimensions used in the above test. Air carrying water fog was conducted through this apparatus. The air was supplied at 2000 ft./min. linear velocity in the test section. An atomized water fog 47 (FIG. 1) was generated by sonic nozzle 45 No. SDC 125H made by Sonic Development Company. Air pressure of 40 pounds per square inch gauge was used in the nozzle 45, as recommended by the manufacturer, to generate the finest practicable mist. The nozzle 45 injected the mist 47 upstream of the first stage of baffles. For comparison purposes, wooden baffles were used in place of the fibrous baffles 25. In addition, the apparatus according to this invention was compared with two stages of a high-velocity commercial vane-type eliminator, the "Euroform" eliminator disclosed by Regehr (Supra) and also in a leaflet entitled MUNTERS EUROFORM D-MIST-R. Visual methods of assessing water fog penetration were used. In addition, the Tyndall dispersion effect on a strong light beam placed normal to the flow direction at the gas outlet was observed. Typical results are presented in Table III.

TABLE III

Visual and Tyndall Beam Determination of Fog Penetration
Velocity = 2000 ft./min.

| Unit Tested | Observed Penetration |
|---|---|
| 2-stage Wood Baffles | Heavy |
| 2-stage Fiber-Baffles | None |
| 2-stage Euroform eliminator (see above) | Light |

The air exiting the apparatus according to this invention was observed to be at the air wet-bulb temperature and was saturated with water. This indicates that heat and mass transfer in the practice of this invention takes place at a high rate and efficiently in spite of the fact that at the high gas (air) velocity, the residence time of the liquid in the gas is extremely short.

The apparatus according to this invention thus serves as a gas absorber or for general mass-transfer as well as a compact direct wet heat exchanger. Because of the effectiveness of the apparatus for mist removal and the unique interaction between the liquid droplets and fibers of the pad, the apparatus according to this invention has advantages as a wet particulate scrubber.

In conventional particulate-removal by wet or spray scrubbing or venturi scrubbers, water is atomized either at a spray nozzle or by gas frictional shear and injected into the gas stream containing the particulates which are to be removed. The gas is confined in a shell or a duct or a conduit and moves at a high velocity relative to the fixed spray nozzle or initial gas-liquid contact region. The atomized water spray leaving the initial gas-liquid contact region is at a lower velocity than the gas and is rapidly accelerated by the gas stream until the water droplets achieve the velocity of the gas stream a relatively short distance downstream from the nozzle or initial contact zone. Only during the acceleration period do the spray droplets possess a differential velocity relative to the particulates in the gas stream and only during this period do the water droplets offer an impingement target for collision with the particles moving along with the gas at the gas velocity. Collision capture is a function of the relative velocity of the particles and droplets. Obviously, once the droplets attain the same velocity as the particulates, there is virtually no chance of particulate collision-capture by the drops, so that venturi and spray scrubbers only operate in the relatively short droplet acceleration zone.

In the practice of this invention, the atomized water droplets, after they have been partially or wholly accelerated to the velocity of the gas stream, are captured by the fiber composing the fibrous baffle of this invention. Collision and momentary adherence of a droplet to a fiber brings the droplet to a rest position, so that the relative velocity of the particles with respect to the captured droplet is the full velocity of the gas stream passing the fiber. On the outer or upstream fiber layers, the velocity of the gas is essentially that of the free gas stream, while for interior fibers removed from the upstream face, the relative velocity is that of the portion of the gas flowing through the fibrous-body means (baffles 25 or vanes carrying fibrous bodies). At high gas velocities, the droplet tends to either be reentrained by gas friction for subsequent recapture by a deeper fiber, or grow by capture and coalescence with other droplets. Those droplets that grow in size by capture coalescence with other drops are rapidly drained off down the fiber under the influence of gravity, or become unstable in the presence of gas frictional forces and shatter into smaller droplets. Because gas friction is moderated in the interior and downstream portions of the fibrous-body baffles, the growth-drainage mechanism dominates in these regions. However, because larger drops tend to be quickly removed, the moving gas and the particles it contains are exposed in the practice of this invention to a dynamic drop population in which the smallest drop sizes predominate, and in which a significant portion of these droplets are held at rest or in retarded flight relative to the velocity of the particles. The efficiency of droplet capture of fine particles is governed by the number and size of the target droplets, as well as the relative particle-droplet velocity. For a given quantity or rate of spray liquid injection, the number of droplet targets is inversely proportional to the size of the drops, so that smaller drops provide a larger number of targets than do larger drops, and the collection efficiency is greater for a smaller mean droplet size. Further, for fine particles a general rule of thumb relating collection efficiency to target size is that the maximum impingement efficiency occurs when the target diameter is approximately 5 to 10 times that of the particle diameter. By controlling the initial drop-size distribution at the spray nozzle, and the fiber count and fiber diameter of the fibrous-body baffle, this efficiency can be optimized for a particulate size or size distribution. This phenomenon only occurs for non-capillary fibrous body means. In the case of capillary bodies the gas flow is blocked by the liquid which fills the pores of the bodies.

EXAMPLE II

The apparatus according to this invention as shown in FIGS. 1-3 was used to test for particulate-removal efficiency using a fine fly ash obtained from a local power plant of Duquesne Light Company. The fly ash had been collected from the combustion gas by means of an electrostatic precipitator and microscopic examination showed that it contained a significant fraction of less than 1 micron particle sizes. In the apparatus used in this example there were two stages; the first stage 21 upstream, a primary irrigated collection stage and downstream stage 23, a demisting stage. Each stage contained three rows of fibrous pads or baffles. The primary collection stage 21 included three rows of stainless steel wire pad elements 25, made from corrugated knitted-mesh wire, each pad $\frac{3}{4}$ inch thick and otherwise having the same dimensions as the elements of Example I. The demisting stage 23 consisted of three rows of the fibrous elements used in Example I.

The primary collection stage was sprayed concurrent with gas flow, using a Bete Fog Nozzle Company Type ST6FCN spray nozzle 45, operated at 225 psig water pressure, giving a flow rate of 3.4 GPM. Gas flow was 1648 CFM, as determined by pitot-tube traverses to arrive at the average velocity, and the overall pressure drop was 5" of water. A 250-gram weighed sample of the fly ash was fed into the suction side of the air blower over a period of 45 seconds to yield a high inlet loading of more than 3 grains per standard cubic foot. The water draining from each stage during the test was collected, filtered, and the recovered solids dried and weighed. The weight of the recovered fly ash was 207 grams, representing a weight recovery of 82.8%. In view of the unrecoverable losses to the walls and unwashed parts of the system, and the fact that only one wetted-fibrous body stage 21 was employed, the 82.8% direct recovery is remarkably high.

Figure 6:
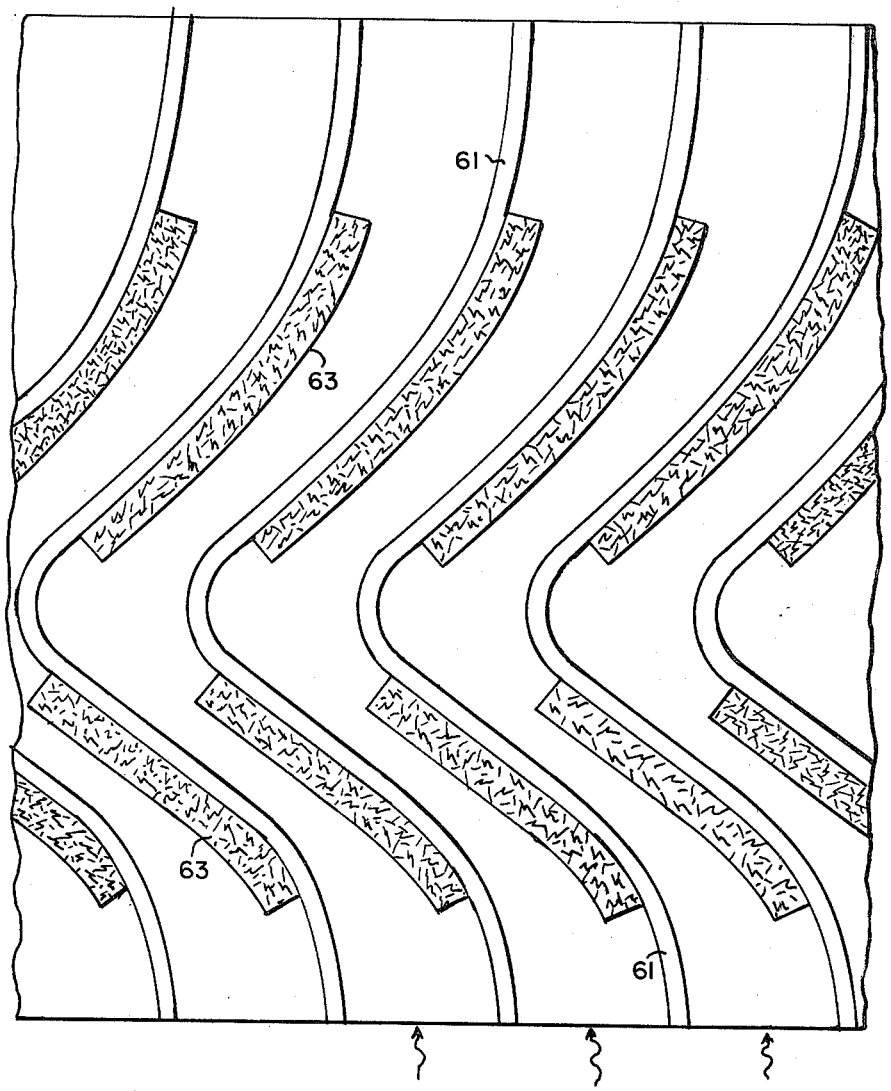
FIG. 6 is a plan view of a modification of this invention including sinuous, zig-zag, or serpentine vanes having fibrous bodies mounted thereon.

The apparatus shown in FIG. 6 includes a horizontal flow channel or conduit 60 within which a plurality of vertical, generally parallel spaced vanes 61 of serpentine shape are mounted. Typically the vanes are composed of ⅛" thick polystyrene panels and are spaced about 1" apart. Spaced along the opposite faces of each vane 61 there are a plurality of vertical pads 63 of fibrous, high voidage, non-capillary, free-drainage material. The pads 63 may be secured to the vanes by an adhesive. The conduit has a top and a bottom (not shown) and the vanes 61 and pads 63 extend from the top to the bottom. A high velocity horizontal stream of particle-laden gas passes through the conduit 60. The particles are captured by the fibrous pads and washed down through the pads 63 and along the vanes 61 under the pads.

Figure 7:
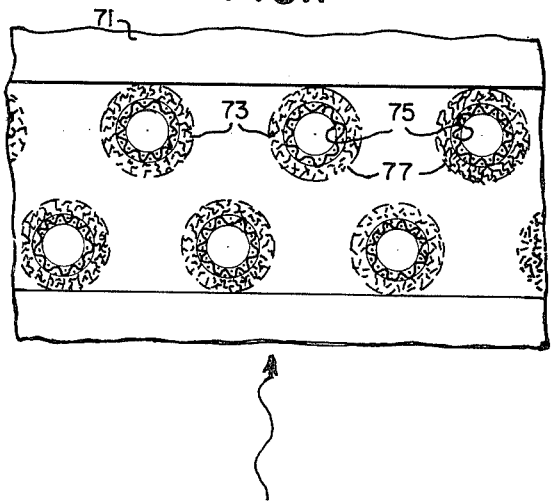
FIG. 7 is a plan view, generally diagrammatic of another modification of this invention.

The apparatus shown in FIG. 7 includes in a horizontal flow channel or duct 71 similar to the duct 11 of FIG. 1 within which there are a plurality of vertical baffles 73. Each baffle 73 includes a generally cylindrical screen 75 on the outer surface of which there is an annulus 77 of fibrous, high-voidage, non-capillary, free-draining material. The baffles extend between the top and bottom (not shown) of duct 71.

Figure 8:
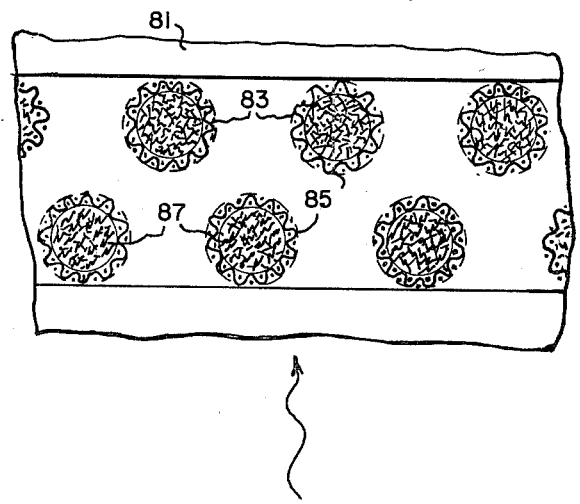
FIG. 8 is a plan view, generally diagrammatic, of a further modification of this invention.

The apparatus shown in FIG. 8 includes a horizontal channel or duct 81 similar to duct 11 of FIG. 1 within which there are a plurality of baffles 83. Each baffle 83 includes a generally cylindrical screen 85 within which there is a mass 87 of fibrous, high voidage, non-capillary, free-draining material. The baffles 83 extend between the top and bottom (not shown) of the duct.

In the apparatus of FIGS. 7 and 8, one stage of two rows of staggered baffles 73 and 83 are shown. There may be any desired number of stages, each stage having a plurality of rows of staggered baffles 73 or 83, the baffles of each row being aligned with the spaces between the baffles of preceding and succeeding rows.

FIGS. 9 and 10 each shows a fibrous body 100 with anisotropic properties with respect to gas flow and gas-flow resistance. The body 100 is fabricated in layers or sheets 101 parallel to the outer surfaces. Such a body has lower gas-flow resistance for flow parallel to the layers 101 as shown in FIG. 9 than for gas flow normal to the layers as in FIG. 10.

While preferred embodiments of this invention have been disclosed, many modifications thereof are feasible. This invention is not to be restricted except insofar as is necessitated by the spirit of the prior art.

I claim:

1. Apparatus for the continuous removal of mist from a mist-laden gas flowing at a high velocity comprising a generally horizontal flow channel through which said gas is conducted generally horizontally, a plurality of generally vertical, fibrous, high-voidage, non-capillary, free-draining bodies interposed in said flow channel, said bodies being anisotropic with respect to gas flow and gas-flow resistance and each body having an exterior surface of major dimension and also having a high-resistance gas-flow path, said bodies being disposed so that a portion of said gas flows through one or more of said bodies and another portion of said gas is deflected by one or more of said bodies, said bodies being oriented so that the high-resistance gas-flow path of each body is normal to the exterior surface of major dimension of said body, said bodies removing and draining, along the bodies generally vertically, the mist from said gas during the flow through and deflection, and means for suppressing the reentrainment of mist drained from said bodies into said gas.

2. Apparatus for the continuous removal of mist from a mist-laden gas flowing at a high velocity comprising a generally horizontal flow channel through which said gas is conducted generally horizontally, a plurality of generally vertical, fibrous, high-voidage, non-capillary, free-draining bodies interposed in said flow channel, said bodies being anisotropic with respect to gas flow and gas-flow resistance and each body having an exterior surface of major dimension and also having a low-resistance gas-flow path, said bodies being disposed so that a portion of said gas flows through one or more of said bodies and another portion of said gas is deflected by one or more of said bodies, said bodies being oriented so that the low-resistance gas-flow path of each body is normal to the exterior surface of major dimension of said body, said bodies removing and draining, along the bodies generally vertically, the mist from said gas during the flow through and deflection, and means for suppressing the reentrainment of mist drained from said bodies into said gas.

3. Apparatus for the continuous removal of mist from a mist-laden gas flowing at a high velocity comprising a generally horizontal flow channel through which said gas is conducted generally horizontally, a plurality of generally vertical, fibrous, high-voidage, non-capillary, free-draining bodies interposed in said flow channel, said bodies being anisotropic with respect to gas flow and gas-flow resistance, said bodies being disposed so that a portion of said gas flows through one or more of said bodies and another portion of said gas is deflected by one or more of said bodies, said bodies removing and draining, along the bodies generally vertically, the mist from said gas during the flow through and deflection, and means for suppressing the reentrainment of mist drained from said bodies into said gas.

4. A scrubber for gas containing contaminants including a generally horizontal flow channel, having walls for confining a fluid in a generally horizontal path and being open at its opposite ends, for conducting said gas in a generally horizontal stream, a plurality of rows of spaced generally vertical baffles interposed in said channel in the path of said stream, each of said baffles being composed of fibrous, high-voidage, non-capillary, free-draining material, and being of substantial length and width, the baffles being anisotropic with respect to gas flow and gas-flow resistance and each baffle having an exterior surface of major dimension and also having a high-resistance gas-flow path, there being open space between each of said baffles and the baffles immediately adjacent to said each of said baffles in said channel, the baffles in each row being displaced along their row with reference to the baffles of an adjacent row, a portion of said gas passing through the baffles on which it impinges and a portion of said gas being deflected by the baffles on which it impinges, the deflected gas following a tortuous path through said flow channel, said baffles being oriented so that the high-resistance gas-flow path of each baffle is normal to the exterior surface of major dimension of said baffle, means for introducing a liquid into said gas in a region of said stream and/or channel such that contact of said baffles by said liquid will result, said contaminants in the gas passing through the baffles being captured by said liquid, and means for draining the liquid containing the captured contaminants from the gas passing down the baffles.

5. A scrubber for gas containing contaminants including a generally horizontal flow channel, having walls for confining a fluid in a generally horizontal path and being open at its opposite ends, for conducting said gas in a generally horizontal stream, a plurality of rows of spaced generally vertical baffles interposed in said channel in the path of said stream, each of said baffles being composed of fibrous, high-voidage, non-capillary, free-draining material, and being of substantial length and width, the baffles being anisotropic with respect to gas flow and gas-flow resistance and each baffle having an exterior surface of major dimension and also having a low-resistance gas-flow path, there being open space between each of said baffles and the baffles immediately adjacent to said each of said baffles in said channel, the baffles in each row being displaced along their row with reference to the baffles of an adjacent row, a portion of said gas passing through the baffles on which it impinges and a portion of said gas being deflected by the baffles on which it impinges, the deflected gas following a tortuous path through said flow channel, said baffles being oriented so that the low-resistance gas-flow path of each baffle is normal to the exterior surface of major dimension of said baffle, means for introducing a liquid into said gas in a region of said stream and/or channel such that contact of said baffles by said liquid will result, said contaminants in the gas passing through the baffles being captured by said liquid, and means for draining the liquid containing the captured contaminants from the gas passing down the baffles.

6. A scrubber for gas containing contaminants including a generally horizontal flow channel, having walls for confining a fluid in a generally horizontal path and being open at its opposite ends, for conducting said gas in a generally horizontal stream, a plurality of rows of spaced generally vertical baffles interposed in said channel in the path of said stream, each of said baffles being composed of fibrous, high-voidage, non-capillary, free-draining material, and being of substantial length and width, said bodies being anisotropic with respect to gas flow and gas-flow resistance, there being open space between each of said baffles and the baffles immediately adjacent to said each of said baffles in said channel, the baffles in each row being displaced along their row with reference to the baffles of an adjacent row, a portion of said gas passing through the baffles on which it impinges and a portion of said gas being deflected by the baffles on which it impinges, the deflected gas following a tortuous path through said flow channel, means for introducing a liquid into said gas in a region of said stream and/or channel such that contact of said baffles by said liquid will result, said contaminants in the gas passing through the baffles being captured by said liquid, and means for draining the liquid containing the captured contaminants from the gas passing down the baffles.

* * * * *